United States Patent [19]

Lawrence et al.

[11] 4,194,534

[45] Mar. 25, 1980

[54] PRESSURE AND TEMPERATURE COMPENSATING HYDRAULIC VALVE

[75] Inventors: William A. P. Lawrence, Simi Valley, Calif.; Robert J. Welchel, Dunwoody, Ga.

[73] Assignee: Elevator Equipment Co., Los Angeles, Calif.

[21] Appl. No.: 896,971

[22] Filed: Apr. 17, 1978

[51] Int. Cl.$^2$ .............................................. F16K 11/10

[52] U.S. Cl. .......................... 137/625.39; 137/596.16; 251/63.6; 251/325

[58] Field of Search .............................. 251/63.6, 325; 137/596.16, 625.3, 625.39

[56] References Cited

U.S. PATENT DOCUMENTS

| | | | |
|---|---|---|---|
| 2,010,129 | 8/1935 | Baker | 251/63.6 X |
| 2,738,803 | 3/1956 | Manning | 251/325 X |
| 3,474,811 | 10/1969 | Blain | 137/80 |
| 3,707,166 | 12/1972 | Lawrence | 137/596.16 |
| 4,132,153 | 1/1979 | Grotness | 137/625.3 X |

*Primary Examiner*—Harold W. Weakley

[57] ABSTRACT

When a Hydraulically operated valve is used to control the operation of a hydraulic elevator, it is required to do so in a manner such that as the elevator cab approaches a floor level in either direction, it is first decelerated through a transition cycle and after that moved slowly a short distance through a creeping cycle to the floor level where it stops. In the up direction, an extra heavy load cuts the transistion time and adds objectionably to the time needed for up leveling. The compensating valve of the invention is interposed in the hydraulic line of the operating valve which normally is depended on to cause deceleration for transition, replacing the deceleration valve. A plunger in the compensating valve is shifted by an increase in hydraulic pressure resulting from an extra heavy load. The shifting causes some of the series of bleed ports to close slowing down return hydraulic flow through the compensation valve which results in readjusting the transition time to what it would be for a light load or no load condition in the cab. Bi-metallic thermally responsive discs acting between the plunger and the housing further modify plunger movement to compensate for change of temperature in the hydraulic fluid such that for example, for a less viscous fluid due to higher temperature the plunger is permitted to move further under pressure of the hydraulic fluid thereby also to close some of the bleed ports and further readjust the transition cycle.

11 Claims, 4 Drawing Figures

Fig. 1.
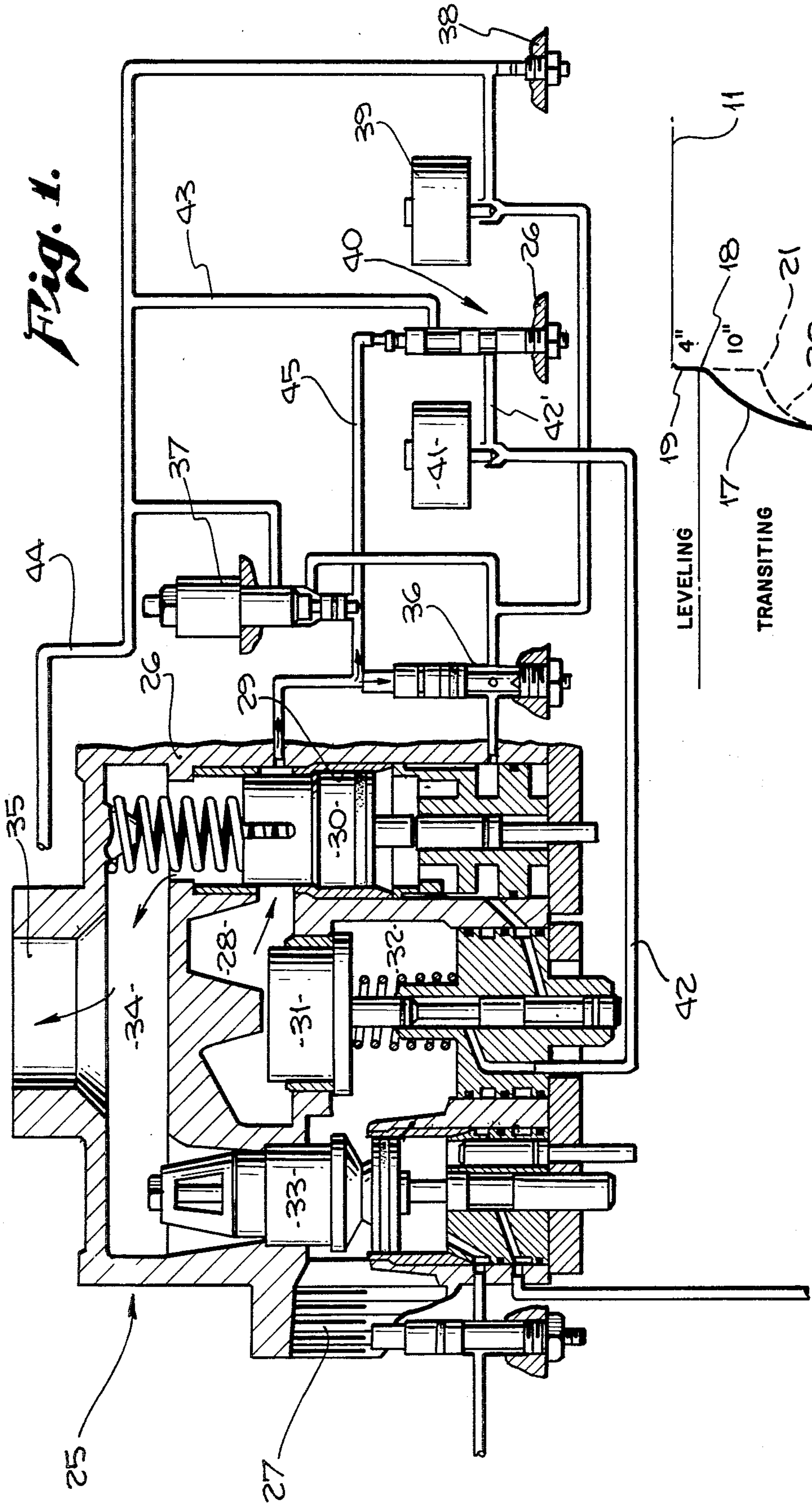
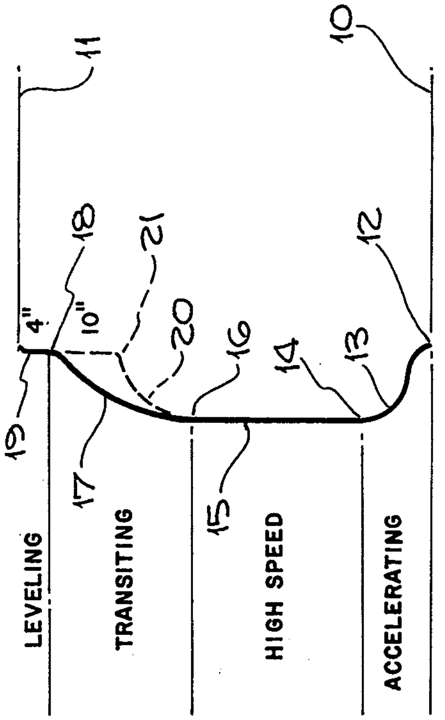
Fig. 4.

PRESSURE AND TEMPERATURE COMPENSATING HYDRAULIC VALVE

Valves which are built to handle hydraulic fluid are commonly subjected to two variables which have appreciable effect on the performance of devices subject to hydraulic operation. One of these variables consists of a change in load, and particularly in increased load. When a load is appreciably increased there is a change in pressure in the hydraulic system which, if not compensated for, may alter the performance appreciably. Another variable consists of changes in temperature which, for most average hydraulic fluids means a lowering of viscosity of the fluid for higher temperature and a raising of the viscosity of the same fluid for lower temperature. The changes in viscosity are reflected in a change in the rate of flow of the hydraulic fluid through valves in the system which also effects the performance of control valves and functioning members of the system.

Valves of the type made reference to are widely used for control of hydraulic elevators. Such hydraulic elevators are commonly used for lifts limited in general to a building height no higher than a feasible and practical length for a hydraulic ram, which must be sunk below the ground surface a distance approximately equal to the heighth of the building. To operate a hydraulic elevator, hydraulic fluid under pressure is supplied through a cylinder in which the ram reciprocates to lift the elevator, gravity being relied upon to lower the elevator. In other words to have such elevators operate efficiently it is desirable that the cab move as rapidly as possible throughout most of the distance between floors. To enjoy such rapid movement, however, it becomes desirable to decelerate movement of the elevator cab as it approaches a stop. Although this means a deceleration whether moving upwardly or downwardly the greater difficulty exists with the cab moving upwardly. After appropriate deceleration from high speed movement the cab must then approach the floor level quickly and accurately to a precise stop. Although such systems may be designed for an average performance, that is to say for the accommodation of what may be assumed to be an average load on the cab, the system then works imperfectly at empty or light load as well as at extra heavy load. When there is an extra heavy load for equipment of this kind the result is a marked increase in pressure in the hydraulic system. This means that during up travel when the cab reaches the point where the speed is to be decelerated from high speeds to up leveling speeds through a transition phase, deceleration is more rapid, occuring in a shorter time, after which the cab must travel a correspondingly greater distance in its approach to a proper floor level which results in an appreciable increase in leveling time before the cab reaches the precise floor level.

It is therefore among the objects of the invention to provide a new and improved compensating valve for hydraulic systems which will automatically adjust to changes in load or hydraulic pressure so as to maintain uniform performance for which the system is set.

Another object of the invention is to provide a new and improved compensating valve for hydraulic systems of the type employed to operate hydraulic elevators of such character that when there is an appreciable increase in load on the elevator cab the valve will compensate in a way such that transition from high speed to up leveling speed remains substantially the same as to rate and duration of time thereby to keep up level time and rate of travel substantially uniform.

Still another object of the invention is to provide a new and improved compensating valve for a hydraulic system of such character that there will be an automatic adjustment in performance of the valve when there is a change of temperature in the hydraulic fluid.

Still another object of the invention is to provide a new and improved compensating valve for a hydraulic system which automatically adjusts either simultaneously or separately to changes both in pressure and temperature whereby to maintain a predetermined performance curve at all times. Still further among the objects of the invention is to provide a new and improved compensating valve for a hydraulic system of such structural characteristics that it can be, in effect, built into a composite or unit valve device so that all of the functioning elemements including the compensating valve may be housed in the common housing and travel of hydraulic fluid from one part to the other substantially minimized.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

FIG. 1 is a schematic view of a hydraulic elevator valve and accompanying system in which the pressure temperature compensating valve device is applicable.

FIG. 4 is a curve of illustrative of performance of a conventional hydraulic elevator.

Figure 2:
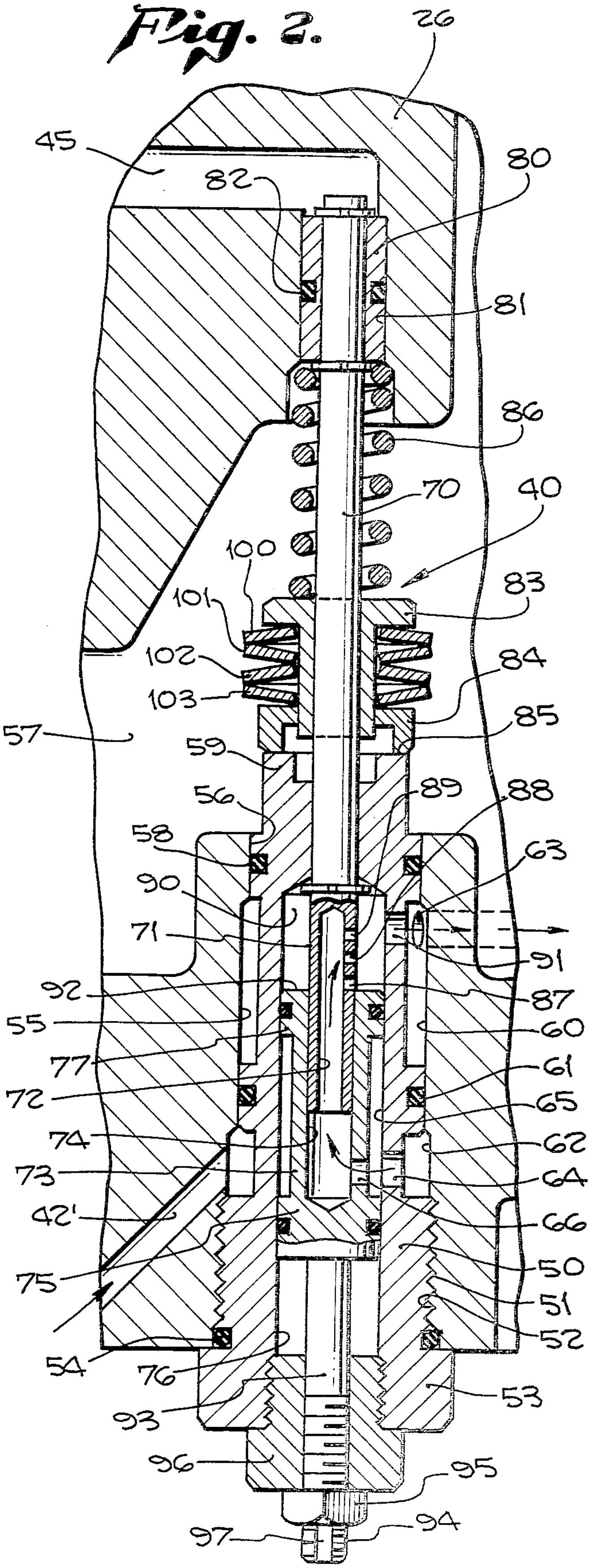
FIG. 2 is a longitudinal sectional view of the valve device shown in its mounting in a housing and with parts in normal open position.

Although the compensating valve of the present invention is one applicable to a wide variety of hydraulic systems, to assist in an understanding of its performance, its relationship to a hydraulic system has been shown in FIG. 1. The performance curve of a hydraulic elevator having optimum characteristics is applied to an elevator cab traveling from a lower floor level 10 to the next higher floor level 11. The elevator cab starting from point 12 initially experiences acceleration through a transition 13 from dead stop to a point 14 where travel commences at high speed through an interval 15. At a point 16 there is a deceleration in speed through a transition 17 until reaching a point 18. After point 18 the cab then slowly moves upwardly through a leveling distance 19 to ultimately stop at the floor level 11.

When for example, there is an extra heavy load placed on the cab the resulting increase in hydraulic pressure of the system causes a more rapid deceleration through a curve 20 indicated by the broken line causing the cab to reach up leveling speed at the point 21. In a typical installation the point 21 may be 10 inches below the floor level 11, whereas the desirable point should be at 18, about 4 inches below the floor level 11. What this means in the typical example described is that the cab will need to travel two and a half times as far during the final leveling movement which is at slow speed, resulting in a correspondingly longer travel time. The invention here involved is directed to maintaining the transition curve 17 at optimum no matter what the load may be on the cab.

To still further assist in an understanding of the invention and provide a typical background, there is shown in FIG. 1 a composite hydraulic valve device 25 portions of which produce the optimum performance curve of FIG. 4. Details of such a composite valve are disclosed in U.S. Pat. No. 3,707,166 Essential aspects of the composite valve, contained in the housing 26 are employed to supply hydraulic fluid under pressure through a hydraulic line 27 to a ram (not shown). Hydraulic fluid arrives at the housing from a suitable pressure source to an inflow port 28. The inflow port 28 is in communication with a bypass chamber 29 controlled by a bypass valve device 30. Also in communication with the inflow port 38 is an uplevel valve device 31 which opens into an up level cavity 32. Hydraulic fluid can pass from the up level cavity around a main down valve combination 33 through the hydraulic line 27. A return cavity 34 directs fluid through a return port 35, and ultimately to a tank (not shown). In association with the assembly just described is an up acceleration valve device 36, a relief valve 37 and an up dump valve 38 under control of an up dump solenoid 39.

The invention here under consideration features in particular a combination pressure temperature compensating valve device indicated generally by the reference character 40, designed to be activated by a compensating solenoid 41. A hydraulic line 42, 42' from the up level valve device 31 supplies the compensating valve device 40 and from which it returns through hydraulic lines 43 and 44 to the tank (not shown). A sensing pressure line 45 subject to hydraulic pressure within the housing 26 at the inflow port 28 provides hydraulic pressure which controls operation of the compensating valve 40.

Figure 3:
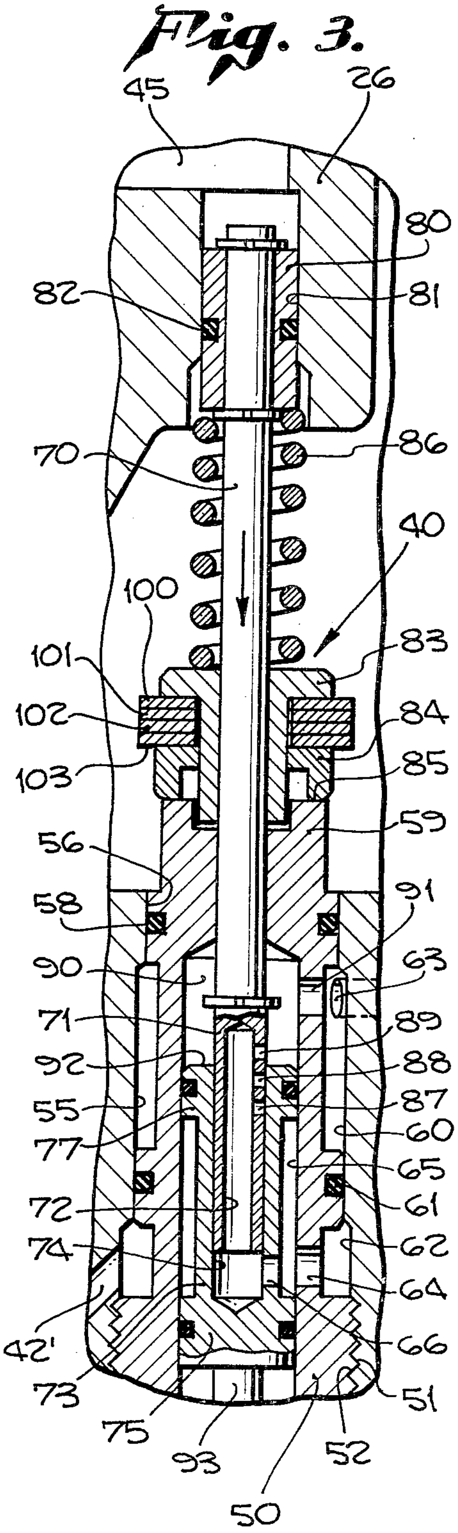
FIG. 3 is a fragmentary longitudinal sectional view similar to FIG. 2 showing the same valve in a position it would have as a result of increased load or higher temperature.

The compensating valve device 40 is shown in detail in FIGS. 2 and 3, and illustrated as being contained within the housing 26.

The compensating valve device includes an elongated substantially tubular body 50 having an exterior threaded portion 51 adapted to fit into a threaded bore 52 by application of a wrench to the flange 53, sealing being accomplished by an O ring 54. The bore 52 has a reduced portion 55 and a cylindrical sealing surface 56 where the bore communicates with a reservoir 57 adapted to communicate with the same source of hydraulic fluid as the hydraulic line 42, 42'.

There is a seal 58 in an extension 59 of the body 50 so as to seal off an annular outflow chamber section 60 from the reservoir 57. Another seal 61 separates the out flow chamber section 60 from an annular inflow chamber section 62. The inflow chamber section is supplied by the hydraulic line 42', the out flow chamber section being adapted to discharge into an out flow port 63, ultimately to communciate with the return hydraulic line 43.

Cooperable with the body is a stem 70, a lower portion 71 as shown in FIGS. 2 and 3 of which is provided with an elongated central cavity 72.

In cooperation with the lower portion 71 is a valve member 73, tubular in shape, and providing an elongated central cavity 74, in communication with the central cavity 72. A flange 75 closes the lower end of the central cavity 74 and also provides a sliding sealed contact within a cylindrical pocket 76 in the body 50.

At the opposite end a flange 77 also provides a sliding sealed contact within the same cylindrical pocket 76.

The stem at the end opposite the lower portion 71 is provided with a piston 80 slidably mounted within a cylindrical opening 81 where an O ring seal 82 assures that there be no communication between the sensing pressure line 45 and the reservoir 57.

There is a bushing 83 surrounding the stem 70 and extending downwardly through a washer 84, the washer 84 resting on an end edge 85 of the body 50. Acting against the bushing 83 is a coiled spring 86 which acts in an opposite direction against the underside of the piston 80. By this agency the piston is normally biased in a direction away from the valve body 50.

The lower portion 71 of the stem 70 is shown as having a sliding telescopic engagement with the central cavity 74 of the valve member 73. Extending through the wall of the lower portion 71 is a series of axially spaced laterally extending ports 87, 88 and 89 which communicate between the central cavity 72 and an annular space 90 which supplies the out flow chamber section 63 and opening 91. By reason of the fact there is relative motion between the valve member 73 and the stem 70 the lower portion 71 serves as a valve element in cooperation with a valve seat 92 of the valve member 73. The relative movement made reference to is one acting between a position such as is illustrated in FIG. 2 wherein all of the ports 87, 88 and 89 are exposed, or open, and a position like that of FIG. 3 wherein only one, namely the port 89, is open.

For changing the close-off position of ports for the stem 70 there is provided means for adjusting the stationery location of the valve member 73. For this purpose there is a shaft 93, extending downwardly through the cylindrical pocket 76 to the exterior where a threaded portion 94 is provided with a tightening nut 95. The nut 95 is adapted to be applied against a bushing 96 which in threaded engagement with the flange 53 closes the outside end of the cylindrical pocket 76. The threaded portion 94 of the shaft 93 is further provided with an exterior wrench hold 97 allowing the shaft 93 to be axially positioned inwardly or outwardly in relation to the bushing 96, which axial displacement serves to relocate inwardly or outwardly as the case may be the valve seat 92.

For providing compensation for changes in temperature of the hydraulic fluid in the reservoir 57 and consequently in the system, there is provided a set of four temperature responsive discs 100, 101, 102, and 103. These discs are annular and mounted between the flanged upper portion of the bushing 83 and the transverse portion of the washer 84. The discs are normally bowed so as to bias the stem endwardly upwards, acting through the coil spring 86 shown in FIG. 2. An increase in temperature is designed to cause the discs to flatten to the position of FIG. 3 thereby permitting the piston 80 and stem 70 to move downwardly to an initial position such as that one shown in FIG. 3.

In operation it must be assumed that the pressure of hydraulic fluid is normal as it would be for example with an elecator cab empty or under light load, and that ambient temperature including the temperature of the hydraulic fluid is normal. Under those circumstances the piston 80 and stem 70 is at the uppermost extremity of its movement as viewed in FIG. 2, thereby to expose all three of the ports 87, 88, and 89. The valve in other words is at full open position. When the valve has a position governing up transition, such for example as the curve 17 of FIG. 4, the transition curve will be normal and leveling movement confined to the anticipated four inches of travel identified by the reference character 19 in FIG. 4.

Should the hydraulic pressure then be substantially increased, as would occur for example should a heavy load be imposed on the elevator cab, hydraulic pressure in the sensing pressure line 45, increased as described, will exert a downward force on the piston 80. Such a downward force acting against tension of the coiled spring 86, will move the lower portion 71 of the stem downwardly to a position where the ports 87 and 88 are closed and only the port 89 remains open. The result is appreciably reduced flow of the hydraulic fluid through the compensating valve device. This reduction in the flow is in contrast to what the flow would be under high hydraulic pressure should there be no compensating valve device in the line. As was previously noted, without such a compensating valve device the higher hydraulic pressure due to a heavier load would shorten thr transition period to one indicated by the broken line 20 of FIG. 4.

Flow through the compensating valve device from the hydraulic line 42' into the inflow chamber section 62 follows a path through a port 64 into an annular recess 65 and then through another port 66 into the central cavities 72 and 74 from which it reaches the ports 87, 88 and 89 depending on the opening position.

Should the circumstances additionally be such that the temperature of the hydraulic fluid in the reservoir 57 is substantially higher than normal the viscosity being reduced would allow the fluid to flow more freely through the ports. Such a condition, in the absence of compensation, would likewise cause hydraulic fluid to flow too rapidly through the up transition cycle. The same objectionable circumstance would occur namely shortening of the transition cycle wherein the up level cycle would be reached too soon and necessitate a much longer travel at slow speed to reach the upper floor level 11.

By having the temperature responsive discs 100, 101, 102 and 103 such that they flatten out at increased temperatures, to the positions shown in FIG. 3 for example, some tension is released in the coiled spring 86 permitting the piston 80 and stem 70 to move downwardly a corresponding distance thereby to close off one or more of the ports 87 and 88, the result of which is a reduction in flow of hydraulic fluid through the compensating valve device. Such a reduction has the same effect as that already described, namely, restoration of the transition curve to that indicated by the reference character 17 of FIG. 4 so that there need be no more than the optimum four inches of up level travel before reaching upper floor level 11.

A lowering of temperature in the hydraulic fluid of the reservoir 57 merely the results in a resumption of the expanded condition of the temperature responsive discs. Similarly removal of excessive load in the elevator shaft results in a diminishing of pressure in the hydraulic fluid and especially the sensing line 45, in which event the coiled spring 86 will return the piston 80 and stem 70 to the uppermost position as shown in FIG. 2.

Although the description of the compensating valve device has been applied expressly to a hydraulic elevator and in particular control of the transition cycle as the elevator cab approaches the up leveling cycle, it should be appreciated that the compensating valve is such that it is capable of compensating for a wide variety of mechanical conditions where pressure greater than normal might be experienced. A temperature compensating feature of the valve make the device applicable to virtually any circumstances where variations temperature of a hydraulic fluid may be anticipated.

Further still although emphasis has been placed upon compensation for an increase in hydraulic pressure and an increase in temperature it can be readily understood that the spacing of the ports, 87, 88 and 89 with respect to the valve seat 92 can be adjusted so that the compensating valve will permit further flow should there be a lighter load than usual or should the temperature of the hydraulic fluid fall appreciably below normal, as for example by providing an additional auxiliary port 87'.

Although longitudinally spaced relatively small ports 87, 88 and 89 have been described by way of example it should be understood that the essence of the invention is to provide variable porting which could also be accomplished by employment of a single port, elongated in character perhaps, and capable of being opened to a greater or lesser degree depending on movement of the stem 70.

What is claimed is:

1. A compensating valve device mountable in a housing for modification of the flow of hydraulic fluid in a hydraulic circuit wherein a hydraulic fluid supply to the housing has a pressure in excess of ambient pressure, said valve device comprising a valve body having mounting means for positioning the valve device on said housing a valve chamber in said body, a valve stem reciprocatably mounted in said body, said stem having a piston at one end responsive to pressure of said hydraulic fluid, means forming a cavity in said stem adjacent the other end having an opening thereto, a valve seat member in said chamber, said valve seat member having a passage in communication with the cavity of said stem through said opening, a divider in said chamber forming respective inflow and outflow chamber sections, and port means serving as a valve element for engagement with said valve seat member and in communication between said passage and said outflow chamber section, said port means having a progressively variable capacity adjustment in response to movement of said piston due to changes in pressure of said hydraulic fluid supply whereby to vary fluid flow between said inflow and outflow chamber sections.

2. A compensating valve as in claim 1 wherein there is a resilient means acting between the valve body and said piston biased in a direction resisting movement of the piston in response to an increase in the pressure of said hydraulic fluid.

3. A compensating valve device as in claim 1 wherein there is a movable adjustment between said valve seat member and said body adapted to shift the location of said valve seat for changing the progressively variable adjustment of said port means, said movable adjustment being accessible from the exterior of said body.

4. A compensating valve device as in claim 1 wherein said valve member is a tube in telescoping relationship with said stem and having a cavity therein in communication with the cavity of said stem.

5. A compensating valve device as in claim 1 wherein there is a hydraulic elevator control in communication with said hydraulic fluid supply, up high speed, up acceleration and up leveling valve members in hydraulic communication with said control, said compensating valve device being in hydraulic communication with said control at a location intermediate said up high speed valve member and said up leveling valve member whereby to compensate for higher pressure in said hydraulic fluid supply in response to an increase in elevator load.

6. A compensating valve as in claim 5 wherein there is a sensing pressure line for said hydraulic fluid between said piston and said hydraulic fluid supply and a flow passage from said hydraulic fluid supply through said compensating valve device to discharge.

7. A compensating valve device as in claim 1 wherein there is a temperature responsive member acting between said stem and said valve body, said temperature responsive member being responsive to the temperature of hydraulic fluid which passes through said valve chamber, said temperature responsive member having a retracting reaction at relatively lower fluid temperatures, and an expanding reaction at relatively higher fluid temperatures tending to resist depression of the piston whereby to enhance flow of said hydraulic fluid through said chamber sections when subjected to said relatively higher fluid temperatures.

8. A compensating valve device as in claim 7 wherein there is a reservoir in said housing in communication with said hydraulic fluid supply, a sensing passage in said housing in communication with said hydraulic fluid supply, and a bore in the housing for reception of said valve body, a portion of said bore surrounding said valve body comprising an annular outside wall for said respective inflow and outflow chamber sections, said temperature responsive member being annular in form extending around said stem at a location within said reservoir.

9. A compensating valve device as in claim 8 wherein there is a cylindrical opening spaced from and in axial alignment with said bore, said cylindrical opening being in communication between said reservoir and said sensing passage and having said piston located therein.

10. A compensating valve device as in claim 1 wherein there is a sensing passage in said housing in communication with said hydraulic fluid supply, a bore in the housing for reception of said valve body, a portion of said bore surrounding said valve body comprising an annular outside wall for said respective inflow and outflow chamber sections, there being a cylindrical opening in axial assignment with said bore, said cylindrical opening being in communication with said sensing passage and having said piston located therein.

11. A compensating valve device mountable in a housing for modification of the flow of hydraulic fluid in a hydraulic circuit wherein a hydraulic fluid supply to the housing has a pressure in excess of ambient pressure, said valve device comprising a valve body having mounting means for positioning the valve device on said housing, a valve chamber in said body, a valve stem reciprocatably mounted in said body, said stem having a piston at one end responsive to pressure of said hydraulic fluid, means forming a cavity in said stem adjacent the other end, a valve seat member in said chamber, said valve seat member having a passage in communciation with the cavity of said stem, a divider in said chamber forming respective inflow and outflow chamber sections, and port means serving as a valve element for engagement with said valve seat member and in communication between said passage and said outflow chamber section, said port means having a progressively variable adjustment in response to movement of said piston due to changes in pressure of said hydraulic fluid supply whereby to vary fluid flow between said inflow and outflow chamber sections, said port means comprising a plurality of longitudinally spaced transverse bores.

* * * * *